United States Patent
Nicholson et al.

[19]

[11] Patent Number: 5,973,599
[45] Date of Patent: Oct. 26, 1999

[54] HIGH TEMPERATURE RFID TAG

[75] Inventors: Mark Nicholson, Scotts Valley; Brian Monahan, Santa Cruz, both of Calif.

[73] Assignee: Escort Memory Systems, Scotts Valley, Calif.

[21] Appl. No.: 08/943,679

[22] Filed: Oct. 15, 1997

[51] Int. Cl.[6] ................................................. G08B 13/14
[52] U.S. Cl. ...................... 340/572.8; 257/788; 174/52.2
[58] Field of Search ........................... 340/572.8, 825.54, 340/825.34, 825.72; 342/42, 44, 51; 364/468.22, 468.23; 361/719, 720, 748; 174/52.2; 257/787, 788, 792, 793; 235/487

[56] References Cited

U.S. PATENT DOCUMENTS

| | | | |
|---|---|---|---|
| 4,578,573 | 3/1986 | Flies et al. | 235/492 |
| 4,656,463 | 4/1987 | Anders et al. | 340/572 |
| 4,737,789 | 4/1988 | Nysen | 342/51 |
| 5,181,020 | 1/1993 | Furukawa et al. | 340/572 X |
| 5,232,765 | 8/1993 | Yano et al. | 428/195 |
| 5,294,477 | 3/1994 | Kanba et al. | 428/212 |
| 5,323,150 | 6/1994 | Tuttle | 340/825.54 |
| 5,428,188 | 6/1995 | Dozier | 174/52.2 |
| 5,528,222 | 6/1996 | Moskowitz et al. | 340/572 |
| 5,580,664 | 12/1996 | Tsai | 340/572 X |
| 5,608,199 | 3/1997 | Clouse et al. | 235/487 X |
| 5,646,592 | 7/1997 | Tuttle | 340/572 |

FOREIGN PATENT DOCUMENTS

| | | | |
|---|---|---|---|
| 594324 | 4/1994 | European Pat. Off. | 340/572 |
| 3609105 | 10/1987 | Germany | 340/572 |

*Primary Examiner*—Thomas Mullen
*Attorney, Agent, or Firm*—Francis Law Group

[57] ABSTRACT

A high temperature RFID tag is described which has a survival temperature in the range of approximately −40° C. to 300° C. and an operating temperature of approximately −20° C. to 200° C. The RFID tag comprises a housing comprising a first thermally resistant material and having a base and a top, and a circuit board substrate comprising a second thermally resistant material which is encapsulated within the housing.

16 Claims, 2 Drawing Sheets

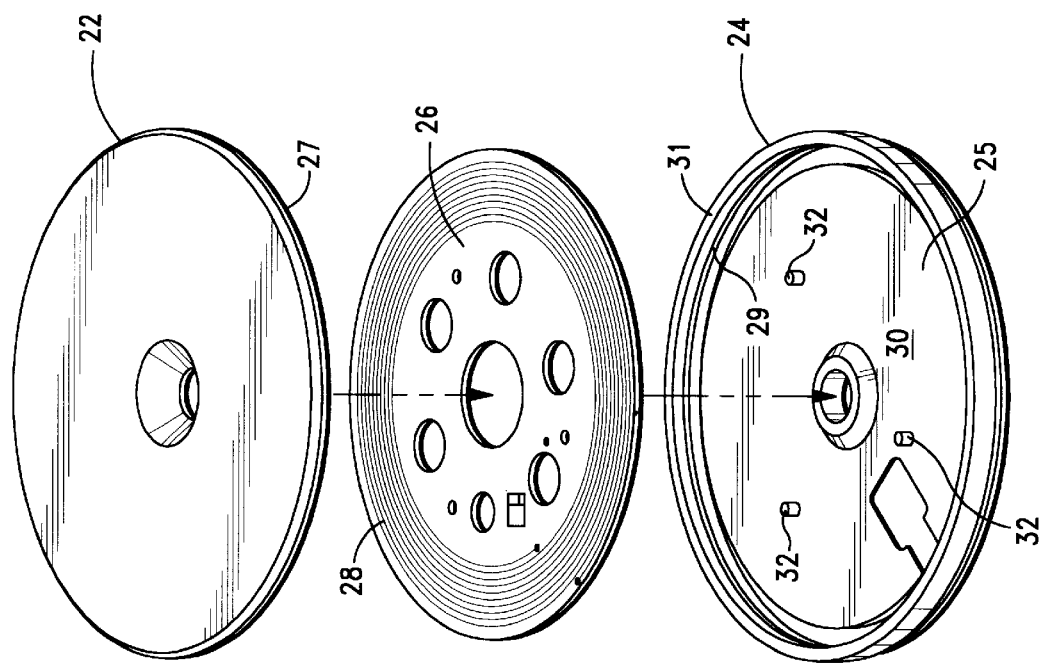
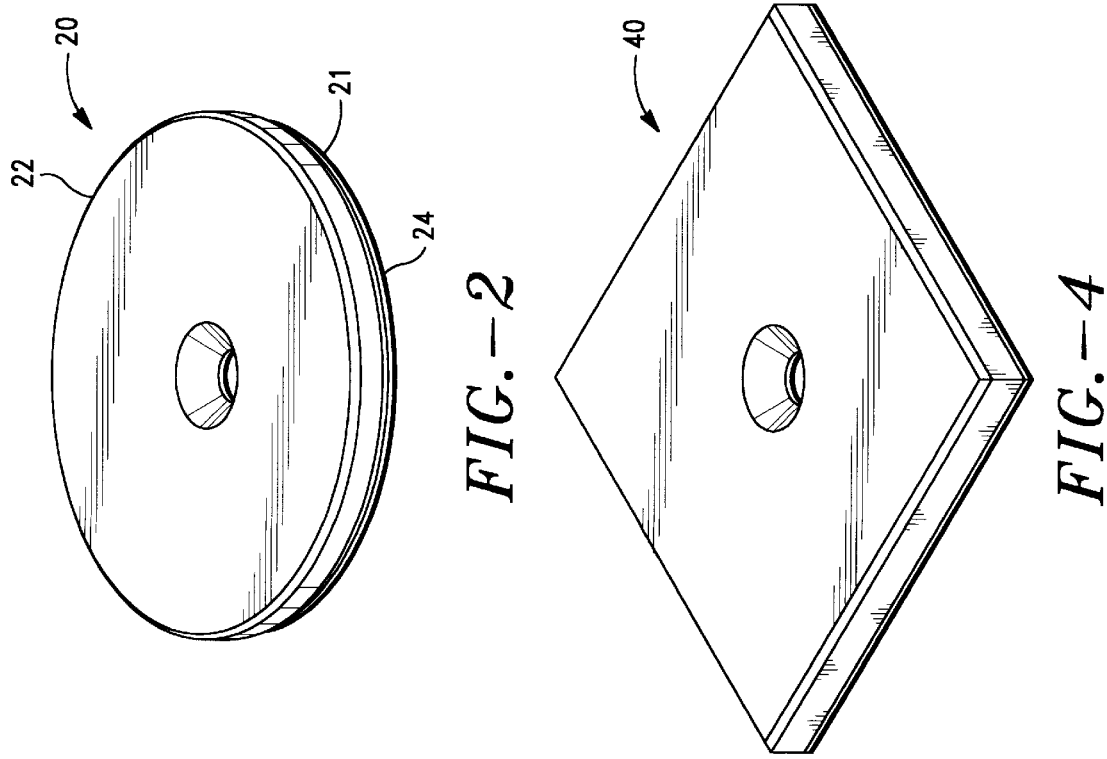

HIGH TEMPERATURE RFID TAG

FIELD OF THE INVENTION

The present invention relates in general to radio frequency identification (RFID) devices, and more particularly to a high temperature RFID tag.

BACKGROUND OF THE INVENTION

RFID systems are well known in the art. Such systems include relatively large packages containing battery powered transmission/receiving circuitry, such as the identification system disclosed in U.S. Pat. No. 4,274,083, to passive systems in which the transceiver receives its power from the base station or interrogator, such as the identification system disclosed in U.S. Pat. No. 4,654,658.

A typical RFID system is made up of reusable tags fixed to or embedded in product carriers, antennas that interrogate the tags via a RF link and a controller. The host (or computer) system interfaces with the controller and directs the interrogation of the tags.

RFID tags provide effective means of identifying, monitoring and controlling materials in a closed loop process. In the factory, tags are employed as the transport mechanism between "islands of automation," providing a record of each process which can be acted upon immediately or downloaded later for analysis.

The tags can be powered by an internal battery (i.e., an "active" tag) or by inductive coupling (i.e., a "passive" tag). Passive tags have zero maintenance and virtually unlimited life. The life span of an active tag is, however, limited by the lifetime of the battery, although some tags offer replaceable batteries.

RFID tags are packaged in a variety of forms and are fastened by a multitude of means. The tags are typically encapsulated for durability against shock, fluids, dust or dirt. Although such tags are immune to most environmental factors, they can, and in many instances will be, adversely affected by high temperature environments.

It is, therefore, an object of the present invention to provide a RFID tag having the capability of operating over a broad range of temperatures.

It is another object of the invention to provide a RFID tag which is capable of operation in harsh, high temperature factory environments.

SUMMARY OF THE INVENTION

The high temperature RFID tag of the present invention has a substantially enhanced survival temperature in the range of −40° C. to 300° C. The tag also has a unique operating temperature in the range of −18° C. to 135° C.

In accordance with the objects and advantages of the present invention, the high temperature RFID tag comprises:
a housing having a base and a top, the base and the top forming a chamber therein, the housing comprising a first thermally resistant material; and
a circuit board substrate disposed within the chamber, the substrate including an integrated circuit, the substrate comprising a second thermally resistant material;
the housing and the circuit board having a survival temperature in the range of approximately −40° C. to 300° C.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 2 is a perspective view of an embodiment of a high temperature RFID tag according to the invention;

FIG. 3 is an exploded perspective view of the high temperature RFID tag shown in FIG. 2; and FIG. 4 is a perspective view of an additional embodiment of a high temperature RFID tag according to the invention.

DETAILED DESCRIPTION OF THE INVENTION

Figure 1:
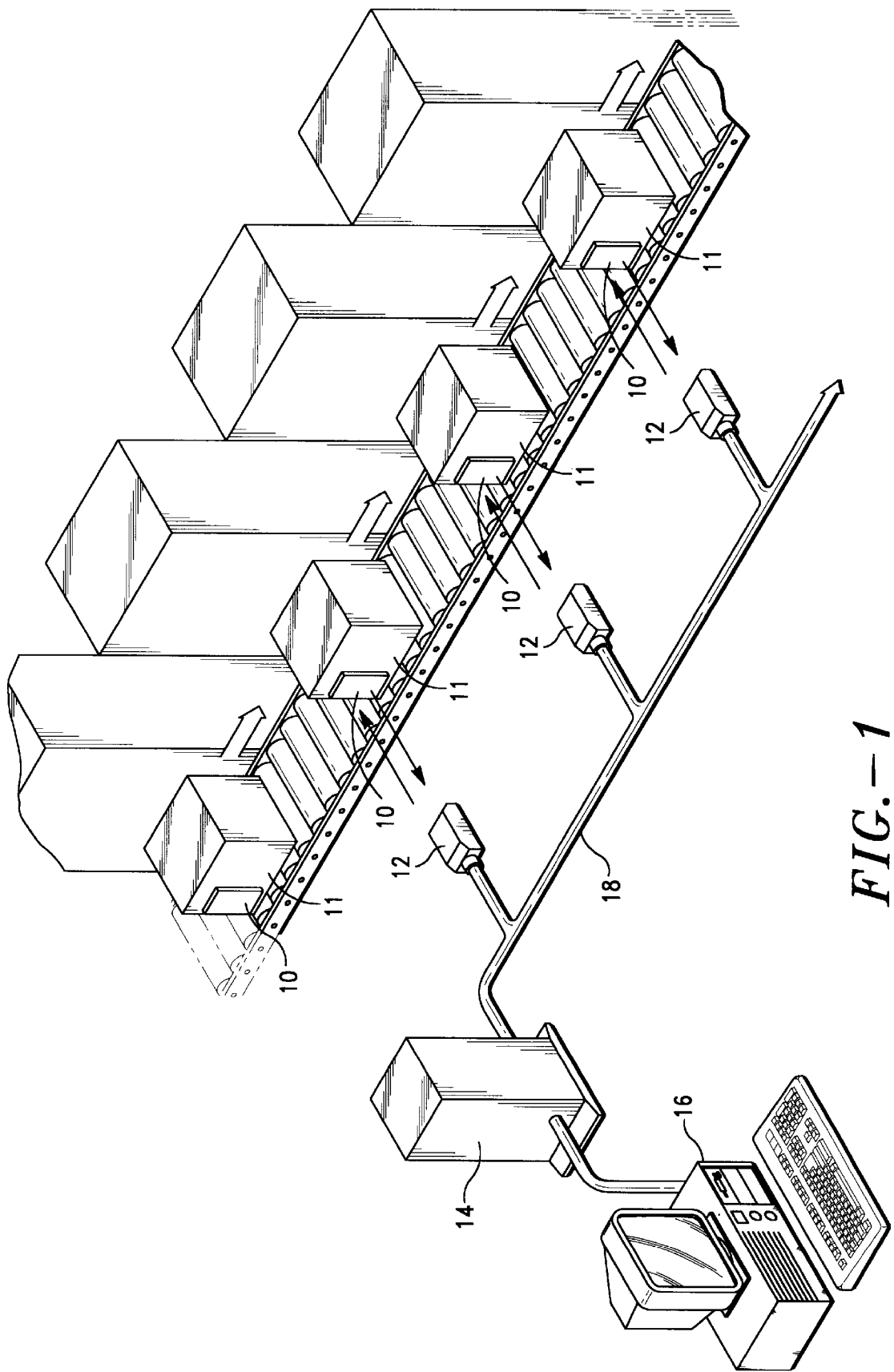
FIG. 1 is a schematic illustration of a typical RFID system.

The high temperature RFID tag of the present invention substantially reduces or eliminates the disadvantages and shortcomings associated with prior art RFID tags. According to the invention, a thermally resistant (i.e., high temperature) housing having a base and top, and a thermally resistant circuit board substrate having an integrated circuit (IC) thereon is provided to achieve the unique survival temperatures and high temperature operating capabilities of the tag.

By the term "operating temperature", as used herein, it is meant to mean the temperature (and/or range thereof) at which the tag can perform the intended functions. The intended functions include read, write and fill functions.

By the term "survival temperature", it is meant to mean the temperature (and/or range thereof) at which the tag can be exposed without adversely affecting the performance characteristics of the tag upon returning to an operating temperature.

Referring first to FIG. 1, there is shown a simple read/write RFID system. The system typically comprises one or more tags (or transponders) 10, containing some data in memory, at least one antenna 12 to communicate with the tags 10, and a controller 14 for managing the communication interface. The host system 16 interfaces with the controller 14 and directs the interrogation of the tags 10 disposed on or embedded in the product carriers 11 and any following action via parallel, serial or bus communications 18.

Referring now to FIG. 2, there is shown a perspective view of a preferred embodiment of the high temperature RFID tag 20 of the present invention. In the noted embodiment, the tag 20 comprises a passive read/write tag. However, as will be appreciated by one having ordinary skill in the art, the concepts of the illustrated embodiment can be incorporated into fabricated active systems.

As illustrated in FIG. 2, the tag 20 preferably has a substantially cylindrical shape, with a diameter in the range of approximately 0.25 in. to 5.0 in., preferably approximately 1.0 in. The tag 20 is thus capable of being attached to or embedded in various surface configurations and limited surface areas.

In an additional envisioned embodiment of the invention, shown in FIG. 4, the tag 40 has a substantially square shape. In accordance with this embodiment, the surface dimension of the tag 40 is preferably in the range of 1 in. to 3 in. (i.e., 1 in.×1 in., 2 in.×2 in., 3 in.×3 in.).

As will be appreciated by one having ordinary skill in the art, the high temperature tag of the present invention can comprise various shapes. The tags can also include various conventional attachment means.

According to the invention, the tag housing 21 preferably includes a housing base 24 and top 22 (see FIG. 3). In additional envisioned embodiments of the invention, not shown, the housing 21 can also comprise a one piece, molded unit.

As illustrated in FIG. 3, the base 24 comprises a substantially cylindrical bottom portion 25 with a circumferential wall 31 disposed on the outer edge, defining a tag chamber 30 therein. The wall 31 preferably includes a cap seat 29 which is adapted to position the housing cap 22.

The base 24 includes a plurality of inwardly projecting suspension pins 32, disposed on the inner surface of the base bottom 25. The pins 32 are adapted to support the circuit board substrate 26 when positioned in the base 24.

As illustrated in FIGS. 2 and 3, the housing top 22 has a correspondingly similar substantially cylindrical shape. The cap 22 is provided with a lower engagement portion 27 which is adapted to slidably engage the inside surface of the cap seat 29.

A key feature of the present invention is the unique high temperature resistance of the housing 21. According to the invention, the housing 21 comprises a high thermally resistant material, such as Teflon® or a Ryton® PPS compound, which can be exposed to high temperatures without materially affecting the material's properties and/or characteristics. In a preferred embodiment, the housing comprises the Ryton® PPS compound, R-4 02XT. The noted thermally resistant materials exhibit a deflection temperature in a range of 287° C. to 320° C.

Disposed in the tag chamber 30 is the circuit board substrate 26. The substrate includes an IC circuit 28 preferably disposed on one surface thereof. As stated, the base 24 is provided with suspension pins 32 to position the circuit board 26 in the base 24.

As illustrated in FIG. 3, the circuit board 26 is similarly substantially cylindrically shaped and is adapted to be positioned within the tag chamber 30. According to the invention, the IC circuit 28 comprises copper or other like material and is clad to the circuit board 26 by conventional means.

In a preferred embodiment, the IC circuit 28 is die bonded to the circuit board 26 via a gold brazing material and is encapsulated using a high temperature epoxy, such as Eccobond® "104". The noted materials exhibit excellent performance characteristics over a broad range of temperatures and, hence, protect the circuit 28 at elevated temperatures.

According to the invention, the circuit board 26 similarly comprises a high thermally resistant material, such as a pre-conditioned polyimid or a ceramic compound. In a preferred embodiment, the circuit board 26 comprises a pre-conditioned polyimid having a Tg of 300° C.

Referring to FIG. 2, the housing top 22 is sealably molded to the housing base 24, encapsulating the circuit board 26 therein. According to the invention, the top 22 is injection molded to the base 24 to provide effective encapsulation. As will be appreciated by one having ordinary skill in the art, various encapsulation methods may be employed within the scope of the invention, such as the one piece, molded housing discussed above.

Applicant's have found that the high temperature RFID tag of the present invention has a survival temperature range of approximately 40° C. to 300° C. and exhibits superior performance characteristics over the operating temperature range of approximately −18° C. to 135° C. The tags may thus be employed in various high temperature industrial environments and/or operations, such as painting operations and engine fabrication, which has not been possible with prior art tags.

While preferred embodiments and their technical advantages have been described in the above detailed description and illustrated in the drawings, the present invention is not limited thereto but only by the scope and spirit of the appended claims.

What is claimed is:

1. A high temperature RFID tag, comprising:
   a housing having base and a top, said base and said top forming a chamber therein, said housing comprising a first thermally resistant material; and
   a circuit board substrate disposed within said chamber, said substrate including an integrated circuit, said substrate comprising a second thermally resistant material;
   said housing and said substrate jointly having a survival temperature in the range of approximately 220° C. to 300° C.

2. The RFID tag of claim 1, wherein said tag has an operating temperature in the range of −18° C. to 135° C.

3. The RFID tag of claim 1, wherein said circuit board substrate is encapsulated in said housing.

4. The RFID tag of claim 3, wherein a high temperature epoxy is employed to encapsulate said circuit board substrate.

5. The RFID tag of claim 1, wherein said first thermally resistant material comprises Teflon®.

6. The RFID tag of claim 1, wherein said first thermally resistant material comprises a Ryton® PPS compound.

7. The RFID tag of claim 1, wherein said second thermally resistant material comprises a polyimid.

8. The RFID tag of claim 7, wherein said polyimid is pre-conditioned.

9. The RFID tag of claim 1, wherein said second thermally resistant material comprises a ceramic compound.

10. The RFID tag of claim 1, wherein said housing has a substantially cylindrical shape.

11. The RFID tag of claim 1, wherein said housing has a substantially square shape.

12. A RFID tag, comprising:
    a housing and substrate assembly,
    said housing having base and a top, said base and said top forming a chamber therein, said housing comprising a first thermally resistant material,
    said substrate disposed within said housing chamber and including an integrated circuit, said substrate comprising a second thermally resistant material,
    said housing and substrate assembly having a survival temperature in the range of approximately 220° C. to 300° C. and an operating temperature range of approximately 18° C. to 135° C.,
    said housing and substrate assembly being capable of exposure to cyclic changes in temperature to and between said operating temperature and said survival temperature without substantially affecting the performance characteristics of the tag upon returning to an operating temperature.

13. The RFID tag of claim 12, wherein said substrate is encapsulated in said housing chamber with a high temperature epoxy.

14. The RFID tag of claim 12, wherein said first thermally resistant material comprises a Ryton® PPS compound.

15. The RFID tag of claim 12, wherein said second thermally resistant material comprises a pre-conditioned polyimid.

16. The RFID tag of claim 12, wherein said second thermally resistant material comprises a ceramic compound.

* * * * *